Figure 1:
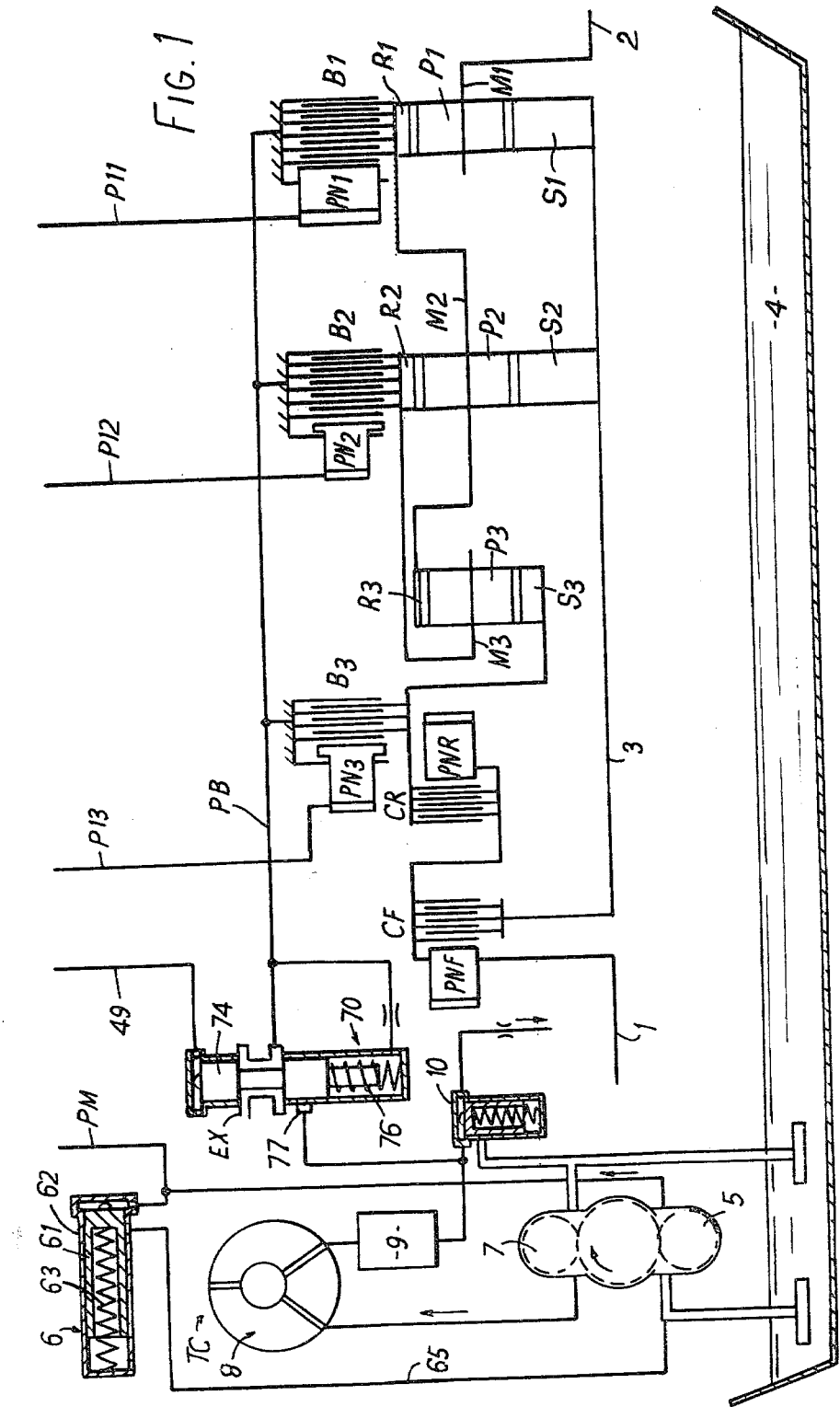

United States Patent [19]

Miller et al.

[11] 4,309,918
[45] Jan. 12, 1982

[54] RETARDING MEANS FOR MOTOR VEHICLES

[75] Inventors: Albert A. Miller, Clovenfords, Scotland; Andrew G. Wilson, Hartley Wintney, England

[73] Assignee: AB Volvo, Goteborg, Sweden

[21] Appl. No.: 89,700

[22] Filed: Oct. 30, 1979

[30] Foreign Application Priority Data

Oct. 30, 1978 [GB] United Kingdom ............... 42398/78

[51] Int. Cl.³ .................... B60K 41/06; F16H 57/00
[52] U.S. Cl. ........................... 74/867; 74/411.5; 74/869; 192/4 A; 192/13 R
[58] Field of Search ............ 74/867, 868, 869, 411.5; 192/4 A, 13 R, 3.23

[56] References Cited

U.S. PATENT DOCUMENTS

| | | | |
|---|---|---|---|
| 2,787,170 | 4/1957 | Forster | 192/3.23 X |
| 2,929,478 | 3/1960 | Tuck et al. | 192/87.13 X |
| 3,038,574 | 6/1962 | Roche | 192/4 A |
| 3,110,378 | 11/1963 | Qualman | 192/4 A X |
| 3,163,270 | 12/1964 | Zingsheim | 192/3.27 |
| 3,444,762 | 5/1969 | Golan et al. | 192/4 A X |
| 3,525,275 | 8/1970 | Lemieux | 74/868 |
| 3,651,904 | 3/1972 | Snoy et al. | 192/4 A |
| 3,863,739 | 2/1975 | Schaefer et al. | 74/869 X |
| 3,994,374 | 11/1976 | Gill | 74/411.5 |
| 4,050,332 | 9/1977 | Taga | 74/869 |
| 4,085,834 | 4/1978 | Kreitzberg | 192/4 A X |
| 4,093,051 | 6/1978 | Kreitzberg | 192/4 A X |

FOREIGN PATENT DOCUMENTS

| | | | |
|---|---|---|---|
| 1023923 | 2/1958 | Fed. Rep. of Germany | 74/869 |
| 811767 | 4/1959 | United Kingdom . | |
| 1459886 | 12/1976 | United Kingdom . | |

*Primary Examiner*—Leslie Braun
*Attorney, Agent, or Firm*—Blanchard, Flynn, Thiel, Boutell & Tanis

[57] ABSTRACT

A change-speed transmission in which gear-ratios are established by engagement of appropriate fluid-pressure operated friction brakes and clutches includes a manually-operable control for partially-engaging, to provide retardation of a vehicle, those friction brakes and/or clutches not in use at any time in establishing a particular gear-ratio. The control operates valves which ensure that the rates of power absorption per unit friction area in all partially-engaged brakes and/or clutches is approximately equal and that the degree of retardation so provided decreases with each down-shift of the transmission.

11 Claims, 2 Drawing Figures

RETARDING MEANS FOR MOTOR VEHICLES

This invention relates to means for retarding motor vehicles which are fitted with change-speed transmission systems of the type in which the gear ratios are engaged by friction means, that is by the use of friction brakes to hold component members of the transmission stationary or by the use of friction clutches to compel two such members to rotate in unison, one with the other.

While the transmission is engaged in any ratio, there are surplus friction means out of use and disengaged. According to this invention, control means are provided whereby any one or all of the said surplus friction means can be effectively employed for braking or retarding the vehicle under the control of the driver.

Such an arrangement confers the advantage that in a vehicle so fitted, an additional retarding means, independent of the normal vehicle wheel brakes, is made available to the driver, without increasing the weight of the vehicle by the provision of additional friction or other form of braking device employed solely for the purpose of retarding the vehicle.

It will be appreciated that the retarding arrangement provided by the invention may, if desired be used for bringing the vehicle to rest, for example in the event of failure of the normal braking system, The principal purpose however which is envisaged for the retarding arrangement is for controlling the speed for the vehicle when descending a long incline thereby relieving the normal braking system of this duty and avoiding the risk of overheating and fading of the normal brakes.

A further advantage of the arrangement according to the invention is that, since the friction means provided for engaging the gear ratios usually are adapted to operate in oil, it is possible so to control the oil flow that it can be used to assist retarding by virtue of its hydrodynamic interference between the friction elements while at the same time enabling the heat generated by the retarding process to be dispersed through the oil cooler which forms part of the transmission cooling system.

Advantageously, the flow of cooling oil to the friction elements is progressively increased as the retarder regulator is moved through a first region of its travel, further movement of the regulator causing engagement of the friction surfaces with progressively increasing force. In this way the drag imposed by the presence of the cooling oil between the friction elements provides a controllable degree of hydrodynamic retardation without frictional engagement of the said elements and this can be supplemented by frictional retardation if required, by further movement of the regulator.

When a change-speed transmission of the type described is operating in any one of its discrete ratios, one or more of its brake/clutch devices is required to be fully engaged, that is to say there is no relative rotation between its friction elements. At the same time however there will be relative rotation between the friction elements of all the remaining transmission brakes and clutches which are not then engaged in the operating ratio. If any one of these out-of-use brake/clutch devices is controlled in such a way that a torque reaction is set up between its relatively rotating parts a retarding torque will be imposed on the output member of the transmission, thus tending to retard the motion of the vehicle through the medium of its driving wheels.

It is necessary to observe that the relationship between the said torque reaction set up in any such brake/clutch and the resultant retarding torque imposed on the output member depends not only on which brake/clutch is used for retarding but also on which gear ratio of the transmission is engaged at the time. Consequently it may be necessary to alter the relationship in the torques absorbed by the several brake/clutch devices being employed for retarding whenever the transmission ratio is changed, in order to avoid any substantial change in retarding torque at the output member. For this reason the arrangement according to the invention preferably includes means for automatically varying the torque loadings of the several retarding devices in accordance with the requirements of the particular transmission ratio engaged at any time, without the need for any adjustment of the driver's regulator.

The advantage of being able to combine retarding with gear-shifting in this way is that it allows the rotational speed of the prime-mover to be maintained so that the optimum additional braking effect deriving from its compression and rotary resistance can be used to its full advantage.

An alternative arrangement according to the invention provides means whereby a particular transmission ratio is engaged and maintained as long as the retarder regulator is in an operative position and all or some of the available brakes and/or clutches are controlled so as to absorb retarding torque in a predetermined relationship according to their individual absorption capacities.

Figure 2:
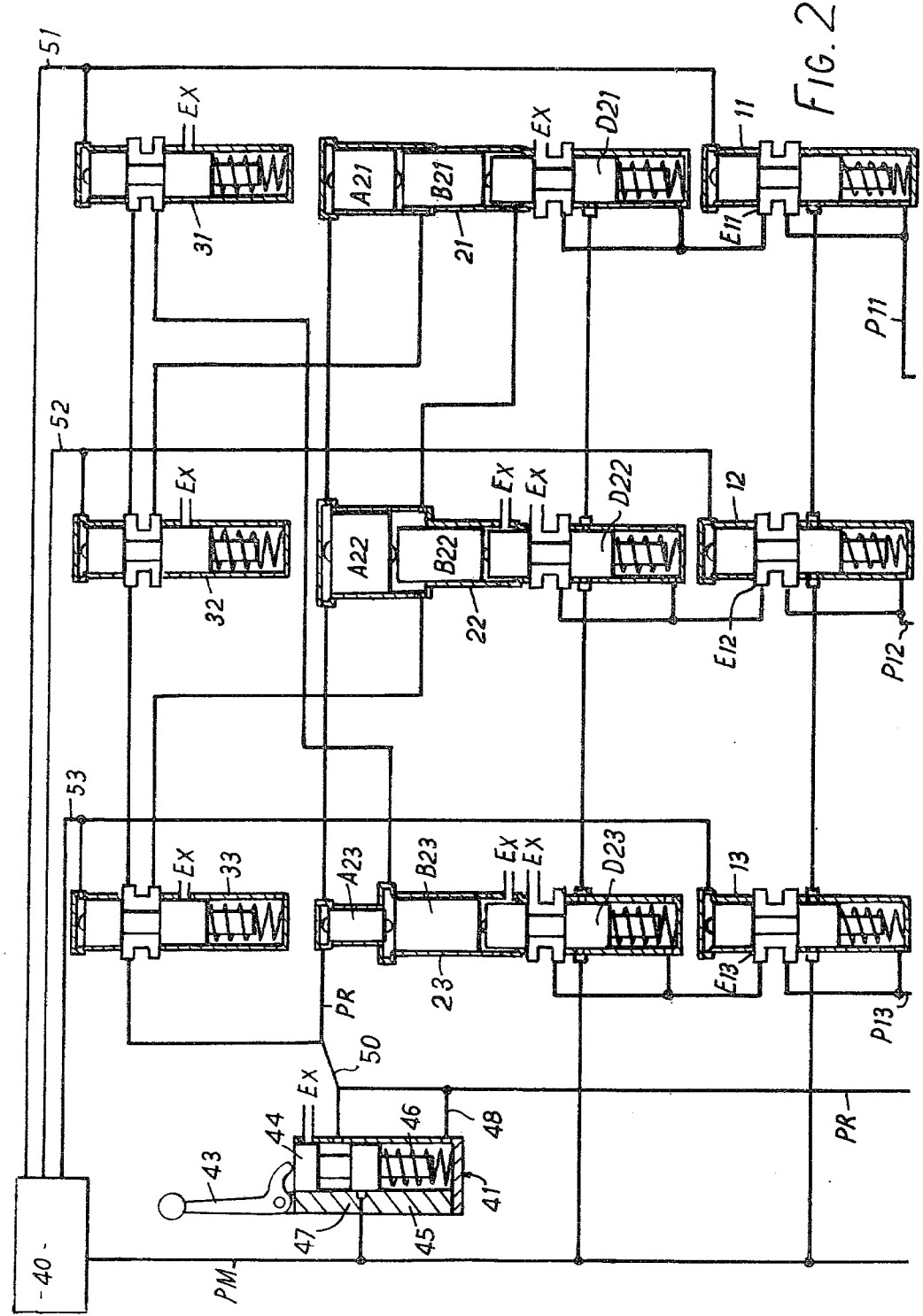

An embodiment of the invention will now be described by way of example with reference to the accompanying diagrammatic drawings, in which:

FIG. 1 shows the torque converter, gearing and pumping system of a change-speed transmission embodying the invention, and FIG. 2 shows the control means for the friction elements of the transmission shown in FIG. 1.

The drawings show a change-speed gearbox of the planetary type providing three forward reduction ratios, a direct-drive ratio and at least one reverse ratio. The transmission includes a system for controlling the brakes associated with the reaction members of the gearbox to provide controllable retardation in all transmission ratios.

An input shaft 1 of the transmission is driven by a prime-mover through a torque converter TC (a fluid coupling or other form of coupling could be used instead) and is rotationally connected to the driving members of a forward clutch CF and a reverse clutch CR.

The gearing comprises three planetary trains having sun gears S1, S2 and S3 and meshing with planet pinions P1, P2 and P3 respectively, which are themselves in mesh with ring gears R1, R2 and R3 respectively. The planets P1 are rotatably mounted in a carrier M1 which is rotationally connected to an output member 2 of the transmission, which in turn is connected to the driving wheels of the vehicle through the usual propeller shaft and final-drive gearing. The planets P2 are mounted in a carrier M2 which is connected to the ring gears R1 and R3 while the planets P3 are mounted in a carrier M3 which is connected to the ring gear R2.

The sun gears S1 and S2 are secured to an intermediate shaft 3 through which they are connected to the driven member of the clutch CF. The sun gear S3 is connected to the driven member of the clutch CR and to the inner discs of a multiple-disc brake B3, which are interleaved with a series of outer discs secured against rotation in the transmission housing. The ring gears R1 and R2 are connected respectively to the inner discs of brakes B1 and B2 the outer discs of which are secured against rotation in the transmission housing. The inner discs and the outer discs are independently slidable on splines in the axial direction so that all the discs of any one brake are capable of being forced into mutual frictional contact to engage the brake. Annular pistons PN1, PN2 and PN3 are slidably enclosed in cylinders and are adapted to engage the brakes B1, B2 and B3 respectively by the application of fluid pressure to their respective cylinders. Similarly, annular pistons PNF and PNR are adapted to engage the clutches CF and CR respectively by the application of fluid pressure delivered through rotary seals, not shown.

When clutch CF is engaged, the 1st speed ratio is obtained by engaging brake B1 to arrest the ring gear R1 and hold it stationary. 2nd speed ratio is obtained by releasing B1 and engaging B2 to arrest and hold ring gear R2. 3rd speed ratio is engaged by releasing B2 and engaging B3 to arrest sun gear S3 and hold it stationary. 4th speed ratio is the direct drive with en bloc rotation, which is obtained by releasing all the brakes and engaging both clutches CF and CR simultaneously. A reverse drive ratio is obtained by engaging the clutch CR together with the brake B1.

In an example of the gearing shown in the drawing each sun gear has 40 teeth, each planet pinion has 22 teeth and each ring gear has 84 teeth. The transmission ratios are then as follow:

```
1st speed ratio = 3.1    :1
2nd speed ratio = 1.85   :1
3rd speed ratio = 1.38   :1
4th speed ratio = 1.0    :1
Reverse ratio   = -4.58  :1
```

For the purpose of this example it will be assumed that the brake data are as follows:

|  | B1 | B2 | B3 |
|---|---|---|---|
| Effective area of friction surfaces in cm$^2$ | 2733 | 2200 | 1319 |
| Effective area of piston(cm$^2$) | 455 | 200 | 200 |
| Frictional torque produced in brake for 1 kg/cm$^2$ fluid pressure on its piston (kgm) | 66 | 28 | 17 |

On the above hypotheses, Table 1 shows the retarding torque that would be imposed on the transmission output member by each available brake in each ratio of the transmission, if a pressure of 1.0 kg/cm$^2$ were applied to its piston.

TABLE 1

| Retarding torque at output member - kgm | | | | |
|---|---|---|---|---|
|  | 1st ratio | 2nd ratio | 3rd ratio | Direct |
| from B1 | (in use) | 39.34 | 54.1 | 66 |
| from B2 | 41.3 | (in use) | 15.6 | 28 |
| from B3 | 77.8 | 21.28 | (in use) | 17 |
| Total on output | 119.1 | 60.62 | 69.7 | 111 |

Table 2 shows the power absorbed in each brake (in HP) and Table 3 shows the power per cm$^2$ of friction area (HP/cm$^2$, when the transmission input member is rotating at 2100 RPM and retarding torques are as given in Table 1.

TABLE 2

| Power absorbed in each brake at 2100 RPM of input | | | | |
|---|---|---|---|---|
|  | 1st ratio | 2nd ratio | 3rd ratio | Direct |
| in B1 |  | 61.6 | 113.9 | 191 |
| in B2 | 38.6 |  | 32.7 | 81 |
| in B3 | 72.3 | 33.2 |  | 49 |

TABLE 3

| Power absorption per unit friction area (HP/cm$^2$) | | | | |
|---|---|---|---|---|
|  | 1st ratio | 2nd ratio | 3rd ratio | Direct |
| in B1 |  | .022 | .042 | .07 |
| in B2 | .018 |  | .015 | .037 |
| in B3 | .055 | .025 |  | .037 |

From Table 1 it will be seen that the total retarding torque is much reduced in 3rd and 2nd ratios if the fluid pressure applied to the brake pistons remains unchanged and from Table 3 it will be seen that the power absorption per cm$^2$ is relatively low in brakes B2 and B3 in certain ratios. Consequently, if the fluid pressure can be suitably distributed between the several brakes and further varied according to the transmission ratio engaged, it will be possible to maintain a more uniform retarding torque at the output member in all ratios for a given setting of the retarder regulator, while at the same time the power dissipated can be shared more uniformly between the various brakes. For example, Table 4 shows the proposed pattern of distribution of pressure to individual brakes when the retarder regulator is set at a pressure of 1.0 kg/cm$^2$. Table 5 shows the resultant retarding torque at the output member and the HP/cm$^2$ absorbed by each brake when the input speed is 2100 RPM.

TABLE 4

| Retarding pressure distribution (kg/cm$^2$) for 1.0 kg/cm$^2$ setting of regulator pressure | | | | |
|---|---|---|---|---|
|  | 1st ratio | 2nd ratio | 3rd ratio | Direct |
| B1 |  | 2.1 | 1.4 | 1.0 |
| B2 | 1.8 |  | 3.6 | 1.8 |
| B3 | 0.5 | 1.8 |  | 1.8 |

TABLE 5

| Retarding torque at output member (kgm) and rate of absorption (HP/cm$^2$) | | | | | | | | |
|---|---|---|---|---|---|---|---|---|
|  | 1st ratio | | 2nd ratio | | 3rd ratio | | Direct | |
|  | Torque | HP | Torque | HP | Torque | HP | Torque | HP |
| B1 |  |  | 83 | .046 | 76 | .059 | 66 | .07 |
| B2 | 74 | .032 |  |  | 56 | .054 | 50 | .067 |
| B3 | 39 | .027 | 38 | .045 |  |  | 30 | .067 |
| Total | 113 |  | 121 |  | 132 |  | 146 |  |

It will be observed that the total retarding torque at the output member diminishes with each down-shift to a lower ratio. The pressures have been chosen deliberately to produce this effect, since in practice the rotary resistance of the prime-mover will add more retardation in the lower ratios and thus the result will be more uniform retardation over the whole range of transmission ratios.

It will also be understood that the retardation torques shown in Table 5 will vary substantially in proportion to any variation of the pressure values given in Table 4 and these latter will themselves be proportional to the pressure setting of the retarder regulator at any instant.

An arrangement whereby the desired distribution of retarding pressure as shown in Table 4 may be derived from the control system of the transmission and applied to the specific brakes is shown diagrammatically in FIG. 2.

Among the conventional elements of the transmission is a main pump 5 which draws oil from a sump 4 and delivers it to a main pressure line PM in which the pressure is regulated by a main regulator valve 6 which allows surplus oil to return to the main pump intake.

The main regulator valve 6 is conventional and comprises a piston 61 slidable in a bore in a casing 62 against the force exerted by a spring 63 to progressively uncover an exhaust port connected by a line 65 to the inlet of the pump 5. The line PM enters a conventional ratio selector valve unit 40 which may be operated either manually or automatically so as to connect the line PM to the pistons of specific relay valves 11, 12, 13, thereby causing them to deliver pressure to whichever brake and clutch or clutches as may be appropriate to establish the transmission ratio required at any time. The valves 11, 12 and 13 are adapted to be operated singly to engage the brake B1 or B2 or B3 respectively, thus establishing 1st, 2nd or 3rd ratio respectively. Similar relay valves are associated with the engaging of clutches CF and Cr, but these are not shown.

The drawing also shows a cooler pump 7 which draws oil from the sump 4 and delivers it through the torque converter 8 (if used), thence through an oil cooler 9 to a lubrication line in which the pressure is regulated by a valve 10 (of similar construction to the valve 6) which allows surplus oil to return to the cooler pump intake. A retarder regulator 41 is fed by pressure from line PM and can be used by the driver to establish the required retarding pressure in the line PR by appropriate movement of a control lever 43.

The retarder regulator 41 comprises a spool valve member 44 which can be progressively pushed, by progressive movement of the lever 43, down a bore in a housing 45 against the action of a spring 46 to close an exhaust port and uncover progressively an inlet port 47 and thereby establish the required PR line pressure. This pressure is applied to the underside of the valve member 44 through a restricted branch line 48.

The PR pressure is applied by a line 49 to a cooler valve 70 (FIG. 1) which is adapted to respond to the pressure PR from a low level, and has a spool valve member 74 progressively movable by increasing PR pressure to close an exhaust port and progressively uncover an inlet port 77 and thereby supply from the lubrication line from the valve 10 to a line PB a flow of oil corresponding in magnitude to the magnitude of the pressure PR. From the line PB this flow passes to the brakes B1, B2 and B3, wherein it passes through slots provided in the surfaces of the friction elements to perform the dual functions of creating hydrodynamic drag and taking away heat generated in the brakes.

The pressure PR is also delivered, by a line 50 to the upper faces of activating pistons A21, A22, A23 of three pressure converter valves 21, 22 and 23 which when activated, deliver oil pressure from line PM through respective relay valves 11, 12, 13 to the pistons PN1, PN2 and PN3 respectively, or to such of these as are not being used to establish the transmission ratio at the time. The values of the pressures delivered to these latter pistons are proportional to the value of the pressure PR at the time.

Each of the pressure converter valves comprise three pistons A.B.D slidable in coaxial bores. The cross sectional areas of the pistons A and B differ as between the three valves in portion to achieve the different magnitudes of pressures required at the pistons PN1, PN2 and PN3 for a given value of the pressure PR and selected ratio. The pistons D are spool-type valve members and can be moved by the net forces exerted by the pistons A and B against a spring to close off an exhaust port EX and thereafter apply fluid pressure from the line PM to the relay valve 11,12,13 at a pressure value corresponding to the force exerted on the spool piston D by the other pistons, this pressure being applied against the free end surface of the spool piston D to obtain the necessary proportionality.

PR pressure is also conveyed to ports of three ratio compensating valves 31, 32 and 33 which are adapted to be operated each one in turn, by pressure from the ratio selector when 1st, 2nd and 3rd ratios respectively are selected. The state of operation of these valves, in accordance with the ratio selected, determines the effective area of activating pistons exposed to PR pressure in the valves 21, 22 and 23. These latter valves, in common with valves 41 and 70, are also of the reaction type; that is to say they deliver pressure at a level which is substantially proportional to the force applied to their activating pistons.

The mode of operation of the retarding system according to the invention will now be described.

It will be assumed that the transmission is operating in the direct drive ratio, with the two clutches CF and CR engaged simultaneously. In these circumstances the ratio selector 40 will have exhausted all pressure from lines 51, 52 and 53; consequently the pistons of valves 11, 12, 13 and of valves 31, 32, 33 will be in their 'off' position as shown in the drawing. It will be seen that in this position of valves 11, 12, 13 the brake pressure lines P11, P12, P13 are in cummunication through their respective valves 11, 12, 13 with the uppermost ports of these valves, which ports would normally be exhaust ports open to the oil sump. In the present arrangement, however, they are connected to the valves 21, 22 and 23 respectively which, in the position shown in the drawing, provide a free passage to exhaust all pressure from the brake pistons.

When the valves 31, 32, 33 are in the position appropriate to direct-drive ratio as shown in the drawings, it will be seen that they provide a passage from the line PR to the space between pistons A21 and B21 and between pistons B21 and D21 of valve 21; also to the space between A22 and B22 of valve 22 and between A23 and B23 of valve 23. Since the tops of pistons A21, A22 and A23 are permanently in communication with the line PR this means that A21, A22 and A23 and B21 are in equilibrium and immune to any displacing force from pressure PR, while D21, B22 and B23 are exposed to its influence.

When the retarder regulator 41 is moved to the 'retarding' position, its piston moves first to close the exhaust port EX and with further movement to commence to open the inlet port, which is connected to line PM. This results in an initial rise in pressure PR, but since PR is also in communication with the underside of the piston it tends to force it upwards to close the inlet port 47 and so maintain a pressure just sufficient to balance the force applied to the top of the piston from the hand lever 43 of the retarder regulator. Thus the operator controls the pressure PR in accordance with the effort which he applies to the handle.

At a relatively low level, the pressure PR will displace the piston 74 of valve 70, which operates on the same principle as the regulator 41, so that the pressure PB delivered to the friction elements of the brakes will approximate to the pressure PR up to the limit of lubrication pressure, which is itself relatively low. Thus the first part of the range of PR pressure can be used to regulate the flow of oil to give hydrodynamic retardation. When more retardation is required however, the operator will exert more effort on the regulator handle so that a higher level of PR is reached, which will be sufficient to displace the pistons D21, D22 and D23 against the force of their return-springs.

Further increase in PR pressure will close the exhaust ports and open the inlet ports of valves 21, 22 and 23 allowing oil to flow from the line PM into the three brake cylinders through the ports E11, E12 and E13 of the ratio relay valves 11, 12 and 13. Since the pressure applied to each brake is also applied to the underside of its respective valve piston D21, D22, D23, the pressure will rise only sufficient to balance the displacing force on the activating pistons D21, B22 and B23 respectively. It will be seen that by choosing suitable relationships between the area of each activating piston and that of its restoring piston any required relationship can be achieved between the value of PR and that of the pressure in the individual brake cylinders.

For example, the restoring pistons D21, D22 and D23 each have a cross-section area of 1.77 cm$^2$, while the activating end of D21 is also 1.77 cm$^2$, and those of B22 and B23 are each $1.8 \times 1.77$ cm$^2 = 3.18$ cm$^2$. Now, if the value of PR is 0.5 kg/cm$^2$ when the valves 21, 22, 23 commence to operate against their return-springs the effective displacing pressure on these valves will be PR—0.5 kg/cm$^2$. Thus when PR is increased to 1.5 kg/cm$^2$ the effective pressure of PR will be $1.5 - 0.5 = 1.0$ kg/cm$^2$ and, because of the relative areas of the pistons, the pressures in the brake cylinders will be 1.0 kg/cm$^2$ in B1 and 1.8 kg/cm$^2$ in B2 and in B3. This is the desired pressure distribution as shown in Table 4 for direct-drive ratio, and further increase in PR pressure will increase the brake pressures in the same proportions.

If now the ratio changes to 3rd, the ratio selector 40 will release clutch CR and will pressurize line 53 to the pressure appropriate to operate ratio relay valve 13 to provide the required pressure P13 fully to engage brake B3. In doing so it will shut off its exhaust port E13 thereby isolating B3 from valve 23. At the same time the pressure in line 53 will displace the piston of valve 33 against its return-spring, thus closing its inlet port and opening its exhaust port to discharge all pressure from the undersides of pistons B21 and A22 so that these now become the activating pistons of valves 21 and 22 respectively. B21 and A22 have cross-section areas of 2.48 and 6.37 cm$^2$ respectively, so that the pressure distribution in brakes B1 and B2 in 3rd ratio is as given in Table 4.

Similarly when the ratio changes to 2nd, valves 12 and 32 are activated by pressure in line 52 while valves 13 and 33 revert to their 'off' position due to the pressure having been exhausted from line 53. Valve 12 causes brake B2 to be fully engaged and valve 32 operates to remove all pressure from the space between pistons A21 and B21 while the restoration of valve 33 to its 'off' position restores PR pressure to the undersides of pistons B21 and A22. Now the effective area of the activating pistons of valve 21 is $A21 + D21 - B21$. Thus if A21 is 4.43 cm$^2$ the effective relationship between the activating piston and the restoring piston D21 will be 2.1:1 and since the effective activating piston in valve 23 is now B23 the pressure distribution in B1 and B3 in 2nd ratio will be 2.1 and 1.8 respectively, as in Table 4.

when 1st speed ratio is selected, pressure is exhausted from line 52 and applied to line 51, thus releasing valves 12 and 32 and actuating valve 11 to engage brake B1, and valve 31, which then exhausts PR pressure from the top of piston B23 of valve 23. Now B22 and A23 are the effective activating pistons of valves 22 and 23 respectively and since A23 is 0.88 cm$^2$, or half the area of D23, the pressure distribution in brakes B2 and B3 in 1st speed ratio will be 1.8 and 0.5 respectively, as in Table 4.

In the alternative arrangement according to the invention, in which one particular transmission ratio is retained as long as the retarder regulator is being used, it is preferable that the highest transmission ratio be employed for this purpose.

If the ratio selector is operated automatically, the ratios may be selected in accordance with the level of fluid pressure from a governing source. In this event the highest ratio would be imposed when such fluid pressure level passes through a certain predetermined value. Thus one method of retaining the highest ratio whilst retarding would be to provide the cooler valve 70 with additional ports whereby its operation during the use of the retarder regulator would override the said fluid pressure from the governing source and impose the pressure required to operate the ratio selector to the highest ratio, irrespective of the speed of the vehicle.

If the ratio selector is operated by electrical or electronic means, the highest ratio could be imposed by a suitable switching operation and for this purpose a pressure-operated switch unit could be adapted to engage the highest ratio whenever the pressure in the line PR reaches a significant value lower than that required to operate the valves 21, 22, 23.

When the said alternative method of retarding is employed the valves 31, 32, 33 would be eliminated, as would also the pistons A21, B21, A22 and A23 of valves 21, 22 and 23. These valves would then be operated by introducing PR pressure directly to pistons D21, B22 and B23 respectively.

With this arrangement the application of retarding pressure PR will provide a pressure distribution pattern in brakes B1, B2 and B3 in the proportions shown in Table 4 in the column headed 'Direct'.

When retarding is performed by this method the vehicle can be braked to zero speed by using the retarder regulator and, provided that a torque converter or a fluid coupling or the like is employed in the transmission, the prime-mover will not stall and when the retarding pressure is completely removed, by releasing the regulator handle, the automatic governor will become effective to engage the ratio appropriate to the speed of the vehicle at the time. This method has the advantage of smooth retardation over the whole speed range due to the absence of any steps resulting from ratio changes.

It will be understood that any fluid medium, including air, may be used to operate the valves 21, 22, 23 and 70 and the method of regulating the pressure PR can be other than that represented in the drawing of valve 41. For example, the retarder regulator could be a pneumatic valve delivering variable air pressure to the top of the piston of valve 41.

It will also be understood that brakes B1, B2 and B3 may take other forms than multiple-disc brakes. Similarly the retarding brakes may be replaced by clutches in the case of a layshaft gearbox and such clutches would be employed for retarding the vehicle in a manner similar to the employment of the brakes B1, B2 and B3, although the pressure distribution pattern may be different.

We claim:

1. In a vehicle drive transmission including a multiple-plate friction brake, retardation control means for controlling the operation of said brake, said control means having a control member operable by an operator of the transmission to retard the transmission by variably engaging the multiple-plate friction brake, and means for supplying cooling fluid to the friction surfaces of the brake plates, the improvement comprising said control means including first means responsive to a first movement of the control member to vary the supply of the cooling fluid to the friction surfaces of the brake plates to produce a correspondingly varying fluid drag in the brake, and said control means including further means responsive to progressively further movement of the control member to engage the brake plates to produce a corresponding frictional drag therebetween.

2. The transmission according to claim 1, including a plurality of different gear ratios, a plurality of friction means selectively operable for engaging respective said gear ratios, and means for causing at least one of the friction means which is not applied for engaging its gear ratio to act as said brake.

3. The transmission according to claim 2, wherein the control means, when at least one of the gear ratios is selected due to said one friction means being operated, causes at least two other said friction means to be partially engaged to provide retardation of the transmission, and the control means is arranged to provide a degree of engagement in each said other friction means such that the rates of power absorption per unit friction area in all such other friction means are approximately equal.

4. The transmission according to claim 2 or 3, including at least three alternative said gear ratios, and means for modulating the pressure applied to a given one of the friction means, for a given degree of application of the retardation control means, in accordance with the particular selected gear ratio other than the gear ratio engageable by said one friction means.

5. The transmission according to claim 4, wherein the modulating means are arranged to cause the retarding torque on the output member of the transmission to be substantially the same for a given degree of application of the retardation control means in a plurality of said different gear ratios.

6. The transmission according to claim 3, wherein the friction means are engaged by the application of fluid pressure and the gear ratios are selected by a ratio selector unit, and wherein the retardation contrl means includes pressure converter valves, each having a plurality of operating pistons of differing working areas, and ratio compensating valves arranged to determine, in response to the ratio selector unit and with regard to producing the desired power absorption in each friction means and retarding torque on the output member of the transmission, which piston areas of the pressure converter valves are effective in effecting fluid supply to the partially-engaged friction means to establish the desired pressures therein.

7. The transmission according to claim 3, wherein the gear ratios are selected by a ratio selector unit, and the ratio selector unit is arranged to retain the transmission in one selected ratio during operation of the retardation control means.

8. The transmission according to claim 7, wherein the friction means are engaged by the application of fluid pressure and the retardation control means includes pressure converter valves having pistons with working areas chosen to supply pressure to produce the desired rates of power absorption in the partially-engaged friction means.

9. A vehicle drive transmission, comprising:
rotatable input and output members;
gear means drivingly connectible between said input and output members for providing a plurality of different gear ratios;
a plurality of multiple plate friction clutches cooperable with said gear means and selectively actuable to engage respective said gear ratios;
first control means for selectively actuating respective said friction clutches to engage respective said gear ratios;
a retardation brake for retarding said output member, said brake including, for each said gear ratio, at least one said friction clutch other than a said friction clutch actuated by said first control means in such gear ratio;
a retardation control device;
second control means responsive to an initial operation of said control device for supplying a cooling fluid to the plates of each said friction clutch of said brake to produce a hydrodynamic drag therebetween; and
third control means responsive to a further operation of said control device for continuing said supply of cooling fluid to said brake and for effecting partial engagement of the plates of said friction clutches of said brake to produce a frictional drag therebetween.

10. The transmission of claim 9, wherein said second control means is responsive to a range of said initial operation of said control device for progressively increasing said supply of cooling fluid to said friction clutches of said brake to produce a progressively increasing hydrodynamic drag.

11. The transmission of claim 9 or claim 10, wherein said third control means is responsive to a range of said further operation of said control device for progressively increasing the degree of partial engagement of said friction clutches to produce a progressively increasing frictional drag therebetween.

* * * * *